United States Patent [19]

Farmer

[11] 4,172,335
[45] Oct. 30, 1979

[54] GOOSE DECOY

[76] Inventor: Thomas E. Farmer, P.O. Box 748, Galveston, Tex. 77550

[21] Appl. No.: 797,039

[22] Filed: May 16, 1977

[51] Int. Cl.² .......................................... A01M 31/06
[52] U.S. Cl. ................................................ 43/3
[58] Field of Search .................. 43/3; D22/21, 18, 11

[56] References Cited

U.S. PATENT DOCUMENTS

| 282,851 | 8/1883 | Danz | 43/3 |
|---|---|---|---|
| 1,316,566 | 9/1919 | Fauble | 43/3 |
| 2,639,534 | 5/1953 | Stossel | 43/3 |
| 2,755,588 | 7/1956 | Johnson | 43/3 |
| 2,947,104 | 8/1960 | Johnson et al. | 43/3 |
| 3,029,541 | 4/1962 | Palmer | 43/3 |
| 3,245,168 | 4/1966 | Pool | 43/3 |
| 3,470,645 | 10/1969 | Mattson | 43/3 |

Primary Examiner—Edward M. Coven
Attorney, Agent, or Firm—Howard I. Podell

[57] ABSTRACT

A goose decoy which may be readily stacked in the disassembled condition to enable a hunter to easily carry a supply of the decoys for field use. Each decoy is formed of a detachable flat section shaped as a head and neck of a goose, a curved body section of sheet material shaped as a partial conical surface, and a shaped stake for assembly of the two sections together and mounting to the ground. A number of such decoys may be stacked, one within-the-other and carried in a specially designed quiver mounted as a back pack.

2 Claims, 9 Drawing Figures

U.S. Patent  Oct. 30, 1979  4,172,335
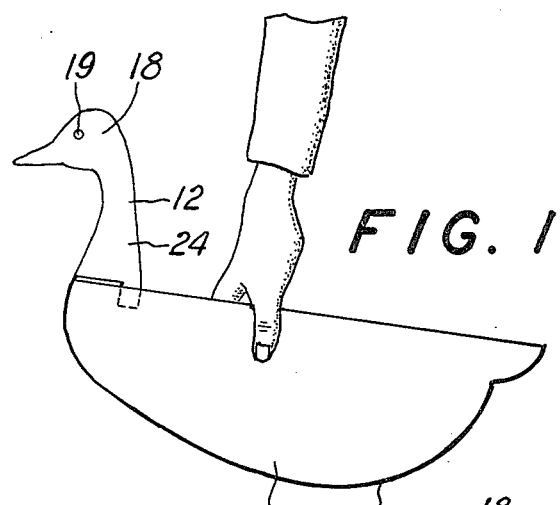
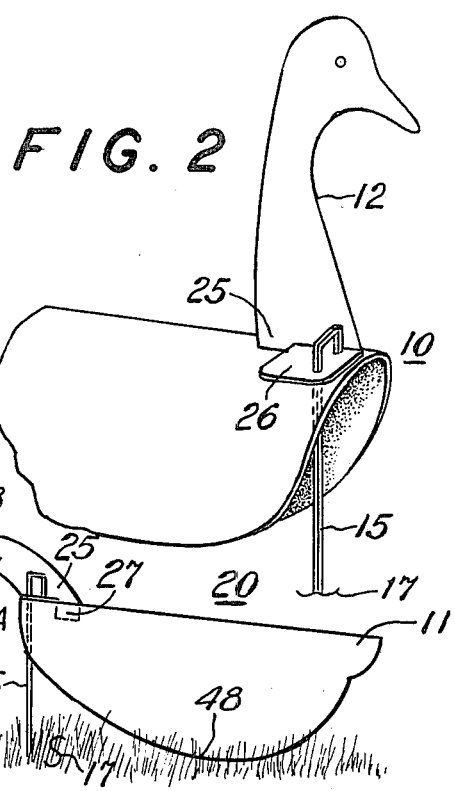
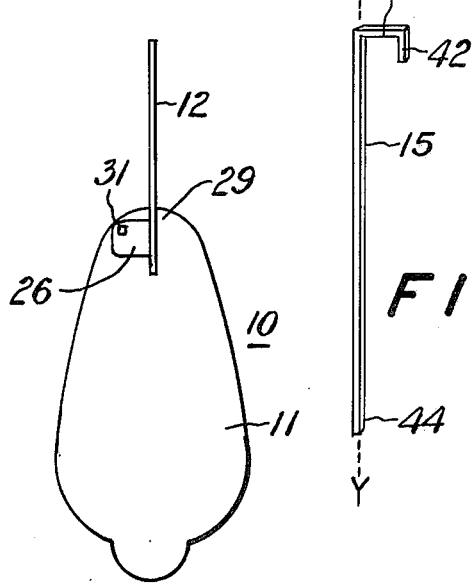
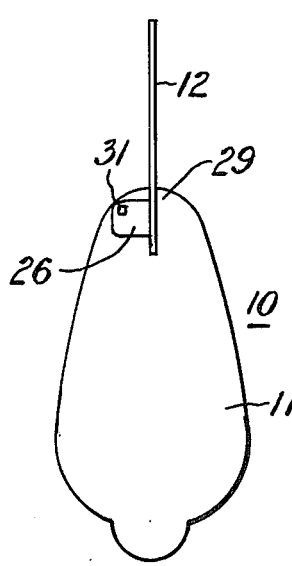
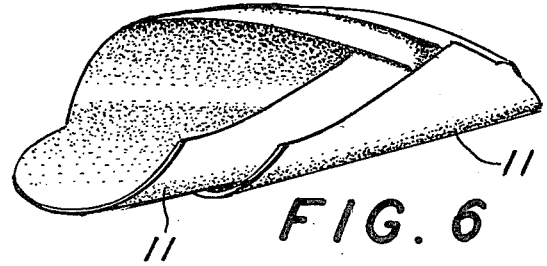
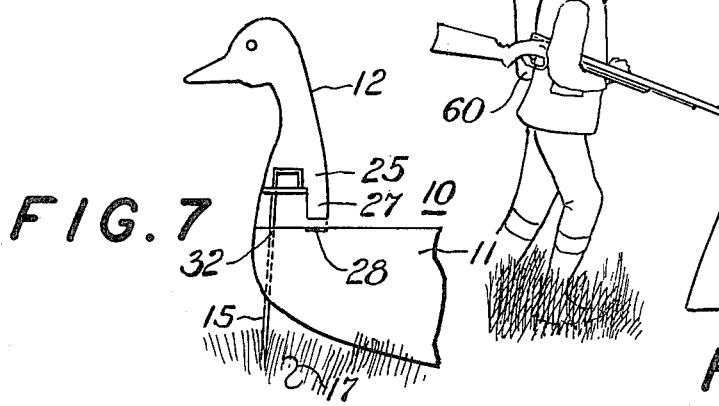
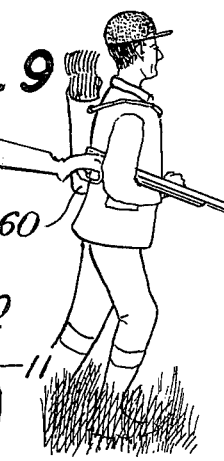

GOOSE DECOY

SUMMARY OF THE INVENTION

My invention is a goose decoy which may be readily stacked in the disassembled condition to enable a hunter to easily, carry a supply of the decoys for field use.

Each decoy is formed of a detachable flat section shaped as a head and neck of a goose, a curved body section of sheet material shaped as a partial conical surface, and a shaped stake for assembly of the two sections together and mounting to the ground.

A number of such decoys may be stacked, one within-the-other and carried in a specially designed quiver mounted as a back pack.

BRIEF DESCRIPTION OF THE DRAWINGS

The objects and features of the invention may be understood with reference to the following detailed description of an illustrative embodiment of the invention, taken together with the accompanying drawings in which:

FIG. 1 is a perspective view of the invention prior to staking;

FIG. 2 is a perspective detail view of the invention in use;

FIG. 3 is a perspective detail view of an alternate form of the invention;

FIG. 4 is a plan view of the invention prior to staking;

FIG. 5 is a perspective view of the stake;

FIG. 6 is a perspective view of several body sections stacked together;

FIG. 7 is a detail exploded side view of the invention;

FIG. 8 is a detail plan view of the assembled invention; and

FIG. 9 is an illustrative of the stacked body sections carried in a back pack quiver.

DESCRIPTION OF THE PREFERRED EMBODIMENT

Turning now descriptively to the drawings, in which similar reference characters denote similar elements throughout the several views, FIGS. 2, 7 and 8 illustrate the goose decoy 10 which is formed of a body section 11, detachably joined to a neck section 12 and held together by a stake 15 that may be fixed into the ground 17.

Neck section 12 is shaped of a flat sheet shaped with the profile of a goose head 18, marked with an eye 19, that is joined to an erect neck profile section 24, the bottom end section 25 of which is joined to a perpendicular flange 26, with a tab section 27 extending in the plane of the neck profile section 24 below the flange 26 so as to fit into a slot 28 in the mid forward section 29 of body section 11.

Alternately, as shown in FIG. 3, decoy 20 may be formed of a neck section 13 of similar configuration to neck section 12, save for a neck profile section 24A that is inclined forward of the bottom end section 25.

A square hole 31 is formed in flange 26 of a rectangular cross-section of similar size to that of stake rod 15 and hole 31, in the assembled condition is aligned with a similar shape hole 32 in the body section 11.

Body section 11 is formed of sheet material bent as a partial conic surface and shaped with a profile 35 resembling that of a goose. As shown in FIG. 6, several body sections 11 may be stacked together, in the disassembled condition.

Stake 15 is formed of a rod of generally uniform rectangular cross-section the top section 41 of which is bent perpendicular to the axis Y—Y of stake 15, with a projection 42 extending from the top section parallel to axis Y—Y towards the free end 44 of the stake, which may be tipped.

Stake 15 fits through aligned holes 31 and 32, as shown in FIGS. 3, 7-8 to hold section 11 and 12 together, with projection 42 bearing externally against flange 26 to retain neck section 12 from rising away from the body section 11, with the lower edges 48 of the body section resting on the ground surface 17 to which stake 15 is fixed.

As shown in FIG. 9, a number of stacked body sections 11 may be fitted in a specially designed quiver 60 that is worn by a user as a back pack. Quiver 60 may also carry the remaining disassembled parts.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A decoy unit which may be assembled to resemble a bird and may be stacked in position, comprising
    a body section shaped of sheet material extending generally along a conic surface so that a plurality of body sections may be nested together,
    a neck section in the profile of a neck and head of a bird formed of sheet material, and
    a separate stake of non-circular cross-section,
    said neck section and body section each fitted with mutually engageable means, and each formed with a hole of similar cross-section to that of the stake,
    said holes aligned in the assembled mode of neck and body sections so that in the assembled mode, the stake may fit through said holes so as to maintain the neck and body section in engagement, in which
    the stake is formed with a pointed tip at a first end and with a bent section formed at the second end of the stake,
    the neck section is formed with profile of a bird's head at a first end of the neck section and formed with a flange at the second end of the neck section,
    said flange of the neck section located to externally bear against the top of the body section, with the bent section of the stake serving to bear externally against said flange, with the stake extending through the aligned holes of the neck and body sections in the assembled position of the decoy unit and with the first end of the stake adaptable for being fixed in ground on which the body section rests so that
    the stake compresses the flange of the neck section against the top of the body section with the bottom of the body section compressed against ground in which the stake is fixed, when the device is assembled for use.

2. The combination as recited in claim 1 in which the bent section of the stake is in the form of an inverted U section, in the erect position of use.

* * * * *